(12) United States Patent
Worrall et al.

(10) Patent No.: US 9,167,411 B2
(45) Date of Patent: *Oct. 20, 2015

(54) EVALUATING ACCURACY OF MOBILITY DATA MAINTAINED BY A COMMUNICATION NETWORK

(71) Applicant: Cellco Partnership, Basking Ridge, NJ (US)

(72) Inventors: Robert Todd Worrall, Annandale, NJ (US); Eugene A. Carucci, Oxford, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 57 days.

This patent is subject to a terminal disclaimer.

(21) Appl. No.: 14/089,213

(22) Filed: Nov. 25, 2013

(65) Prior Publication Data

US 2014/0087726 A1 Mar. 27, 2014
US 2014/0315545 A2 Oct. 23, 2014
US 2015/0119025 A9 Apr. 30, 2015

Related U.S. Application Data

(63) Continuation of application No. 12/124,034, filed on May 20, 2008, now Pat. No. 8,594,664.

(51) Int. Cl.
*H04W 4/00* (2009.01)
*H04W 8/06* (2009.01)
*H04W 8/02* (2009.01)

(52) U.S. Cl.
CPC . *H04W 8/06* (2013.01); *H04W 8/02* (2013.01)

(58) Field of Classification Search
CPC .................................. H04W 8/02; H04W 8/06
USPC ................. 455/432.1, 432.2, 423, 433, 435.1
See application file for complete search history.

(56) References Cited

U.S. PATENT DOCUMENTS

| 7,817,588 | B2 | 10/2010 | Jeon |
| 2006/0089140 | A1 | 4/2006 | Zhang |
| 2007/0076646 | A1 | 4/2007 | Foster |
| 2009/0201823 | A1 | 8/2009 | Minerva et al. |
| 2009/0274113 | A1 | 11/2009 | Katz |

OTHER PUBLICATIONS

Worrall, "Development of a Supplementary Mobile Location Information Capability for Cellular and PCS Networks, Student report: Project Results and Progress," pp. 1-21, Feb. 2, 2004.
Entire prosecution history of U.S. Appl. No. 12/124,034, filed May 20, 2008, entitled "Evaluating Accuracy of Mobility Data Maintained by a Communication Network," now U.S. Pat. No. 8,594,664, issued Nov. 26, 2013.

*Primary Examiner* — Wayne Cai (57) ABSTRACT

A computer-implemented method for systematically evaluating accuracy of data in a home location register, independent of call processing and in the absence of interference with resources required for call processing at the home location register. The method includes operational steps of: identifying, from among a plurality of subscribers, a subscriber serviced by a visited location register and identifying the visited location register servicing the identified subscriber. The method also includes forwarding a message to the identified visited location register to determine if there is a corresponding record for the identified subscriber, and determining, based on a reply to the forwarded message or lack thereof, the accuracy of home location register's record for the identified subscriber.

19 Claims, 3 Drawing Sheets

EVALUATING ACCURACY OF MOBILITY DATA MAINTAINED BY A COMMUNICATION NETWORK

RELATED APPLICATION

This application is a continuation and claims the benefit of U.S. application Ser. No. 12/124,034 Filed May 20, 2008 entitled "Evaluating Accuracy of Mobility Data Maintained by A Communication Network," the disclosure of which also is entirely incorporated herein by reference.

BACKGROUND

Communication networks, such as, for example, wireless networks that utilize IS-41 rely heavily upon accurate mobility data, which may refer to data used for locating a mobile subscriber within a network at a particular time. In order to deliver services such as, for example, call delivery and short message services ("SMS") delivery, IS-41 based networks rely upon this information, which is typically stored in a home location register ("HLR") and a visited location register ("VLR"). The HLR and VLR form the mobility management substrate of IS-41 network and accordingly, their function, malfunction, and normal (customizable) performance within the network are the basis for the accuracy of the mobility data.

As pointed out by the inventor, in a fixed network location, address and routing information are relatively static and methods for routing well established. Robert Todd Worrall, Development of a Supplementary Mobile Location Information Capability for Cellular and PCS Networks (2004) (unpublished, PH.D. candidate's report for peer review only). This is not the case in a mobile environment, however. Id. In a mobile environment, artifacts of mobility affect elements within the mobile environment. Id. Accordingly, having accurate mobility data is essential for a healthy network environment.

Unfortunately, analytical data show that mobility data within the HLR and VLR fail to reach high level of accuracy and consistency. Id. Inaccurate or conflicting records at HLR and VLR impair functions of IS-41 networks. For example, inaccurate information about a location of a mobile device in a network can have a negative impact on services and applications, diminishing the overall performance of the network. Id. To illustrate further, assume that one mobile subscriber (originating) attempts to reach out to another mobile subscriber (destination) by placing a call thereto. In a large communication network, it is not affordable to send the signal generated by the phone call to all networks nodes servicing all mobile devices in order to reach the intended mobile device. This simply overwhelms the system. So, the strategy is to maintain a database at the HLR that includes a current active location of the intended mobile device.

The network references this database, and based on the information stored therein, identifies the network node (e.g. one of the VLRs) servicing the intended mobile device and signals the identified network node (e.g., a VLR) to route the call to the current point of attachment of the mobile device. If the location registration information is incorrect for some reason, processing of the call may require additional signaling to other nodes or fail altogether. Hence, integrity of the data is quite important. Analytical studies show, however, that in a significant number of cases this database includes incorrect information about the location of the intended mobile device. That is, although the database indicates that a particular network node (e.g., VLR) services the intended mobile device, the particular network node (e.g., VLR) has no record for the intended mobile device and indeed does not service the intended mobile device. Therefore, the signaling generated in response to call from the originating mobile device consumes the system resources without having a meaningful result (e.g., without enabling the caller to connect to the destination mobile device).

Sometimes, there are good and valid reasons for such inconsistency between the records of HLR and VLR. For example, this inconsistency may exist for a short period of time in a border history cases as described in more detail below. However, the analytical studies show that there are some cases in which this inconsistency persists for a long period of time and are not suspected to be due to normal operating conditions. A classic example is the situation where a mobile device moves out of the service area of the overall network. In this case, there is no mechanism for the mobile device to signal the network that it is beyond range. Therefore, for at least some time, the network's location management system would understandably report such a mobile at its last known location. These inconsistencies can cause serious problems especially for applications, which are not designed with mobility in mind. For example, these inconsistencies will likely impair service performance and may go unnoticed until a faulted state of the system becomes obvious through service impairment.

Currently, there is no barometer which indicates the accuracy of mobility management data in HLR and VLR subsystems of the mobile communication network. Therefore, there is a need for a long-term and continuous methodology by which the mobile communication networks can measure the validity of mobility management data maintained by HLR and VLR. An operator may wish to utilize such information gathered in order to improve the "correctness" of mobile station location information and thus improve services delivery.

DETAILED DESCRIPTION

In the following detailed description, numerous specific details are set forth by way of examples in order to provide a thorough understanding of the relevant teachings. However, present teachings may be practiced without such details. In other instances, well-known methods, procedures, components, and circuitry have been described at a relatively high-level, without detail, in order to avoid unnecessarily obscuring aspects of the present teachings.

Communication networks rely upon accurate mobility data. As pointed out above, analytical data show that mobility data within the HLR and VLR fail to reach high level of accuracy and consistency. As a result the overall performance of the communication networks is diminished. To better understand the problem, it may be helpful to consider in more detail the configuration of the mobile communication network and how HLR and VLR interact to locate a particular mobile device. Therefore, the following remarks first briefly describe the components of the mobile communication network and then describe the inaccuracy of the mobility data while referring to specific components of the mobile communication network. Lastly, the following remarks provide an overview of the proposed methodology for evaluating the accuracy of the mobility data and then describe this methodology in more detail with respect to FIG. 2.

Figure 1:
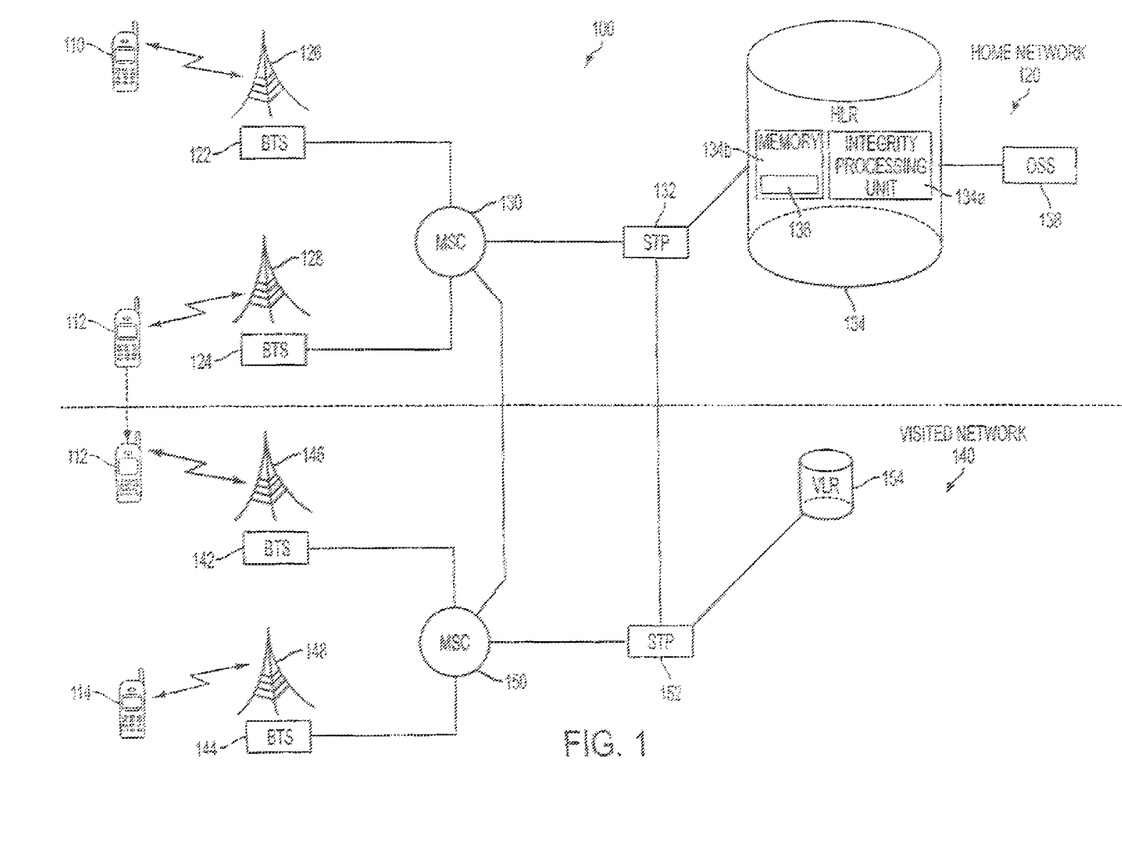
FIG. 1 is a functional block diagram of a mobile communication network that includes a home network and a visited network for providing mobile services to mobile devices operated by a different user.

FIG. 1 is a functional block diagram of a mobile communication network 100 that includes a home network 120 and a visited network 140 for providing mobile services, to mobile devices, three of which are shown as mobile devices 110, 112, and 114 each being operated by a different user. In practice, there may be many number of other networks 'visited' from time to time as a subscriber roams or travels about. The three mobile devices 110, 112, and 114 are merely shown for illustrations and their number is not meant to be limiting. Indeed, home network 120 and visited network 140, which are assumed to be operated by different carriers, provide mobile communications for numerous other mobile devices. These networks offer many services such as, for example, packet data services and mobile voice telephone services. The discussions here, however, will focus on mobile voice telephone services using circuit switched capabilities of network 100.

Each of the mobile devices 110, 112, and 114 represent a general class of mobile devices that operate via public cellular networks or the like. To this end, mobile devices 110, 112, and 114 each include software that enables each mobile device to act as a mobile phone. Each mobile device is configured to receive as an input a telephone number associated with a call recipient and in response send, over home network 120 and/or visited network 140, a request to connect to a mobile device associated with the entered telephone number.

The mobile devices 110, 112, and 114 may be, for example, a wireless telephone, a personal digital assistant ("PDA"), a messaging device (e.g., a pager), a text messaging or a portable e-mail device (e.g., a Blackberry® or a Sidekick®), a portable music player (e.g., an iPod®) or some other electronic portable messaging, entertainment, organization, or gaming device. Each of the mobile devices 110, 112, and 114 may be serviced by a different carrier or service provider. For example, as shown in FIG. 1, mobile devices 110, 112 are assumed to subscribe to services offered by the carrier or service provider operating home network 120, and mobile device 114 is assumed to subscribe to services offered by the carrier or service provider operating visited network 140.

The home network 120, operated by one of the carriers, includes a number of base stations represented in FIG. 1 by the base transceiver systems ("BTS") 122, 124, antennas 126, 128, a mobile switching center ("MSC") 130, a signal transfer point ("STP") 132, and a HLR 136. The BTSs 122, 124 may serve as a hub for radio communications over home network 120 and may support sub-layers of an air-link protocol carried for transmitting and/or receiving data packets to and/or from mobile devices 110, 112, respectively. The BTSs 122, 124 could be using one of several mobile access technologies for allowing mobile devices 110, 112 to connect to MSC 130. For example, BTSs 122, 124 may be using access technologies such as global system for mobile communications ("GSM"), general packet radio service ("GPRS"), code division multiple access ("CDMA"), ultra mobile broadband ("UMB"), long term evolution ("LTE"), and/or WiMax. The BTSs 122, 124, however, are not limited to these technologies and may use other technologies.

Regardless of the type of technology used by BTSs 122, 124, they are configured to allow the mobile devices 110, 112 to connect to MSC 130. To this end, each BTS 122, 124, using its respective antenna 126, 128, communicates with mobile devices 110, 112. The antennas 126, 128 each servers a subset of the overall geography covered by home network 120. For example, in FIG. 1, antenna 126 covers mobile device 110 in one region or "cell" of home network 120, whereas antenna 128 covers mobile device 112 in home network 120.

Moving forward, each BTS 122, 124 is configured to assign and reassign channels to mobile devices 110, 112 and to monitor the signal levels to recommend hand-offs to other base stations. Toward this end, home network 120 typically includes a base station controller ("BSC") functionality (not shown) that controls the functions of a number of base stations and helps to manage how calls made by each mobile station are transferred (or "handed-off") from one serving base station to another. Each wireless network equipment vender implements this function differently. Some vendors have a physical entity, which they call a BSC, while other vendors include this functionality as part of their MSC 130.

The home network 120 also includes a number of radio access network switches. These switches typically are modern versions of mobile switching centers ("MSCs") or Mobile Telephone Switching Offices (MTSOs), which support both cellular voice and packet data services. As shown, MSC 130 may connect through trunk circuits to BTSs 122, 124, which the respective switch serves and controls. In one implementation, MSC 130 provides voice service switching for calls between mobile devices 110, 112 via interconnecting trunks and to other devices via the PSTN network (not shown) (e.g., for calls to and from landline telephones). Additionally, MSC 130 also provides voice service switching via trunks to one or more MSCs (e.g., MSC 150) in the other carrier's wireless network for communications with mobile device 114 currently operating through visited network 140.

The home network 120 also includes one or more STP 132, typically deployed as mated pairs of STPs, coupled to MSC 130 of home network 120 and to elements of the PSTN through signaling system number 7 ("SS7") link sets. The STPs and the links thereto provide a signaling network, for use in managing call traffic.

For wireless services, the mobile devices are provisioned to normally operate in the serving area of one wireless system operated by the user's access service provider that is to say one of the carriers. In keeping with the previous example, the service provider operating home network 120 is the home carrier for mobile devices 110, 112, therefore home network 120 is the "home" location or system for these mobile devices. For voice communication services, most implementations of home network 120 include HLR 134, which stores data regarding the valid stations' identifications, the assigned telephone numbers, subscription service options, terminal capabilities, etc. The home network 120 uses the information from HLR 134 to provide the subscribed services to each user's mobile device, while the mobile device is operating in the service area of home network 120.

Although HLR 134 may reside in a MSC or other switch, today, HLR 134 may run as an application/database on a separate computer coupled for SS7 type packet signaling communication via the STPs 132. In some networks, the computer or server providing the HLR functionality is referred to as a SCP. Of course, there may be multiple computers distributed throughout home network 120 for performing the HLR function. In some implementations, the SCP functionality is incorporated into a MSC or into a switch or router of the packet network providing the SS7 signaling communications. Other implementations provide packet communications to/from the element serving as the HLR via IP networking.

The HLR 134 includes an integrity processing unit 134a and a memory 134b. The integrity processing unit 134a is configured to systematically evaluate the accuracy of mobility data stored in memory 134b and its function will be described in more detail with respect to FIG. 2. The memory 134b may store data regarding valid stations' identifications, the assigned telephone numbers, subscription service options, terminal capabilities, and mobility data. The mobility data may refer to data used for locating a mobile subscriber within a network at a particular time. In particular, the mobility data may include location registration information identifying the network node servicing a particular mobile device. In one implementation, as described further below, the integrity processing unit 134a uses this information to signal the identified network node and determines whether the location registration information is accurate. Thereafter, the integrity processing unit 134a may store a result associated with this determination inside memory 134b. In particular, the integrity processing unit 134a may store the result within a data structure 136 inside memory 134b. The data structure 136 may include information about the particular mobile device along with information about the accuracy of mobility data associated with the particular mobile device. In one example, the stored information include mobile identification number and that the mobility data associated with the mobile identification number is accurate.

Although different radio access networks may utilize different technologies or architectures, for discussion purposes it is assumed that home network 120 is generally similar to visited network 140. Like home network 120, the physical elements of visited network 140, include a number of base stations represented in FIG. 1 by BTSs 142, 144, a number of antennas 146, 148, a MSC 150, and a STP 152. Therefore, these components are not described here in more detail.

Each visited network 140 also includes one or more VLRs 154 (only one visited network and one VLR are shown for convenience). The VLR 154 is used to facilitate roaming and attendant registration, and it may reside in MSC 150, although its function may be implemented separately in other network nodes as shown. As a customer roams, a mobile device registers in service areas other than the service area of home network 120. For instance, as mobile device 112 crosses the border line (e.g., the dashed line between home network 120 and visited network 140), it will register with service areas of visited network 140. To do so, mobile device 112 will register with VLR 154 through MSC 150, and VLR 154 interacts with HLR 134 to validate the roaming mobile device 112. For a validated mobile device 112 and during a successful registration process, service information is downloaded from HLR 134 to VLR 154 in a visited network 140. The validation process also provides information to HLR 134 indicating the current location of mobile device 112 in this case, within visited network 140, to allow home network 120 to route incoming voice calls to mobile device 112 at its current location. The VLR-HLR communications typically utilize SS7 signaling via one or more STPs.

Now that the components of mobile communication network 100 have been fully described, it is perhaps helpful to utilize them to describe how accurate/inaccurate mobility data can affect mobile communication network 100. The first example represents a case of a successful location management within mobile communication network 100 due to an accurate mobility data. In this scenario, assume that mobile device 110 calls mobile device 112, which has roamed into visited network 140. When MSC 130 receives the incoming call, from mobile device 110 to mobile directory number ("MDN") of mobile device 112, it launches a query to HLR 134 asking for instructions as to how to route the call to mobile device 112 at its current location. As outlined above, the HLR's data indicates the current VLR registration location of the called mobile device 112. That is, the HLR's data indicates the VLR 154 is presently servicing the called mobile device 112. Hence, at this point in the call processing, HLR 134 initiates signaling to VLR 154 to obtain the data necessary for routing the call to mobile device 112 at its current location. In a typical implementation, HLR 134 initiates second signaling, by transmitting a route request message through the signaling network to VLR 154 and thus the serving MSC 150 at which mobile device 112 is currently registered.

In response to this request, MSC 150 associated with VLR 154 assigns a temporary location directory number ("TLDN") to mobile device 112 and provides that number to VLR 154 which transmits the assigned TLDN number back to HLR 134. Upon receiving the TLDN, HLR 134 transmits a message back through the signaling network to MSC 130 that received the incoming call from mobile device 110, providing the assigned TLDN to that switch. The MSC 130 uses the TLDN to route the call through to MSC 150 at which mobile device 112 is currently registered, which in turn will initiate paging of mobile device 112 to attempt completion of the call. Accordingly, the incoming call from mobile device 110 (homed and currently serviced by home network 120) is forwarded to mobile device 112 (home at home network 120 but currently serviced by visited network 140). This transaction is representative of a successful location management within mobile communication network 100.

As shown by the above example, routing of the call requires the HLR data to identify the current network point of attachment or location for the called mobile device 112. If the HLR data is inaccurate or incomplete, the call routing typically will fail. For example, HLR 134 may attempt to signal a VLR with which the destination mobile device 112 is not registered. This will consume resources for signaling between HLR 134 and VLR but will not result in a complete call.

To illustrate further, assume that mobile device 112 is located on the border line (e.g., dashed line between home network 120 and visited network 140). In such a location, mobile device 112 is in a transitional state between MSC 130 belonging to home network 120 and MSC 150 belonging to visited network 140. Since, BTSs 124, 142 along with their respective antennas 128, 146 are adjacent to each other, there is an overlap in their converge, providing network continuity between adjacent networks. As pointed out by the inventor, the question arises as to which MSC (e.g., MSC 130 or 150), HLR 134 should report as serving switch. Robert Todd Worrall, Development of a Supplementary Mobile Location Information Capability for Cellular and PCS Networks (2004) (unpublished, PH.D. candidate's report for peer review only). In one case, when mobile device 112 crosses the border line, roaming into visited network 140 and staying there, MSC 150 is servicing mobile device 112 and mobile device 112 is registered with VLR 154. Id.

However, in another case, mobile device 112 being close to the border may keep crossing it back and forth, therefore the switch servicing it may constantly change, leading to high resource utilization (due to many sequential updates at HLR 134) and erroneous location information during periods of transition. Id. There are several strategies to overcome this problem. One strategy includes suspending location information update for short period of time for mobile device 112 moving on the border and resuming it thereafter hoping the transition period is over and consistent and correct information can be generated. Id. In this case, during the transition, it is possible that HLR 134 does not include a valid address for mobile device 112. Therefore, this transaction is representative of an unsuccessful location management within mobile communication network 100.

For another example, assume that after roaming into visited network 140 mobile device 112 moves out of the service area of the overall network. In this case, as noted above, there is no mechanism for mobile device 112 to signal the network (e.g., HLR 134) that it is beyond range. Therefore, for at least some time, HLR 134 would understandably report such a mobile at its last known location (e.g., VLR 154).

As noted above, these situations can cause serious problems especially for applications which are not designed with mobility in mind To solve these problems, the proposed methodology can detect this inaccuracy and can inform the operator of the same.

In one implementation, the methodology is implemented in HLR 134, and it systematically evaluates the accuracy of data in HLR 134, independent of call processing and in the absence of interference with the resources required for normal call processing at HLR 134. To this end, the method includes steps of identifying, from among the plurality of subscribers, a subscriber serviced by a VLR and identifying the VLR servicing the subscriber. To do so, HLR 134 (or one or more processes implemented therein) may refer to its subscription volume and identify one or more active subscribers that have roamed outside of home network 120 and into a visited network. The one or more active subscribers may include subscribers that have their mobile device on.

In keeping with the previous example, HLR 134 may identify mobile device 112 and, even though, mobile device 112 has moved outside of the overall network, HLR 134 may identify VLR 154 servicing mobile device 154. As noted above, this is natural because VLR 154 was the last known node at which mobile device 112 was registered.

Moving forward, HLR 134 generates a message and forwards it to the identified VLR (e.g., VLR 154) to determine if there is a corresponding record for the identified subscriber and thereby determine the accuracy of the mobility data in its database. Upon receiving the forwarded message, VLR 154 may perform a search within its records to determine whether mobile device 112 is still within its network. In doing so, in this example, VLR 154 determines that mobile device 112 has moved outside of its network. Accordingly, VLR 154 replies to the message from HLR 134 indicating that VLR 154 has no record for mobile device 112. The HLR 134 receives the message and determines based on the message that its mobility data for the identified subscriber is not accurate.

HLR 134 may sequentially perform this process for various mobile devices as long as its operation does not interfere with its call procession function. Indeed, HLR 134 may implement particular safe guard mechanism to ensure that its real-time call processing receives priority over evaluating mobility data accuracy. In one example, the safety mechanism is configured to continuously evaluate whether operational steps of the method for systematic evaluation of mobility data in HLR 134 interferes with required resources for call processing at HLR 134 and upon determination of the same suspends operation of the method and return real-time allocations for processing and memory to normal call processing function.

Along these lines, HLR 134 continues the operational steps of the method until it collects sufficient data to establish statistical significance while consuming the least system resources required. To this end, HLR 134 identifies another subscriber serviced by a visited network and checks whether its data is accurate for the identified subscriber according to the above-described manner That is, after identifying a VLR serving the subscriber, HLR 134 forwards a message to the VLR to determine whether the VLR has a corresponding record for the identified subscriber. The VLR may respond to the message indicating that indeed there is a corresponding record for the identified subscriber. Alternatively, the VLR may respond to the message indicating that there is no corresponding record for the identified subscriber, or the VLR may simply fail to respond to the message within a predetermined time period.

In the first case, HLR 134 determines that its mobility data for the identified subscriber is accurate, whereas in the second or third case, HLR 134 determines that its mobility data for the identified subscriber is not accurate. In either case, HLR 134 stores the test results to a persistent storage repository for subsequent analysis (e.g., review by operation staff and posterior correlation analysis). For example, HLR 134 may store the evaluation result or supply it to an operating support system ("OSS") 138.

With the information produced, a mobile provider gains valuable information about the "correctness" of its mobility management subsystems. While there are many possible applications for the information produced, the following are a few examples. When mobility faults are found, HLR 134 can take corrective actions. For example, HLR 134 may stop sending traffic for the identified subscriber to the VLR 154 now knowing that VLR 154 is not servicing the identified subscriber. This reduces the cost of SMS, TLDN, signaling and related processing.

Additionally, based on the produced information, the carrier can observe and measure performance of mobility management systems. Along these lines, HLR 134 and OSS 138 can identify faults by providing details about a mobile device (e.g., mobile device 112) that has moved outside of the network or is otherwise not available, thereby enhancing overall service performance. Furthermore, this methodology may enable comparison of impact of multi-vendor systems interoperability in the context of services delivery. Additionally, the proposed methodology may enable observation of the impact (if any) of network or socio-geographic events upon the correctness of dynamic routing information.

Figure 2:
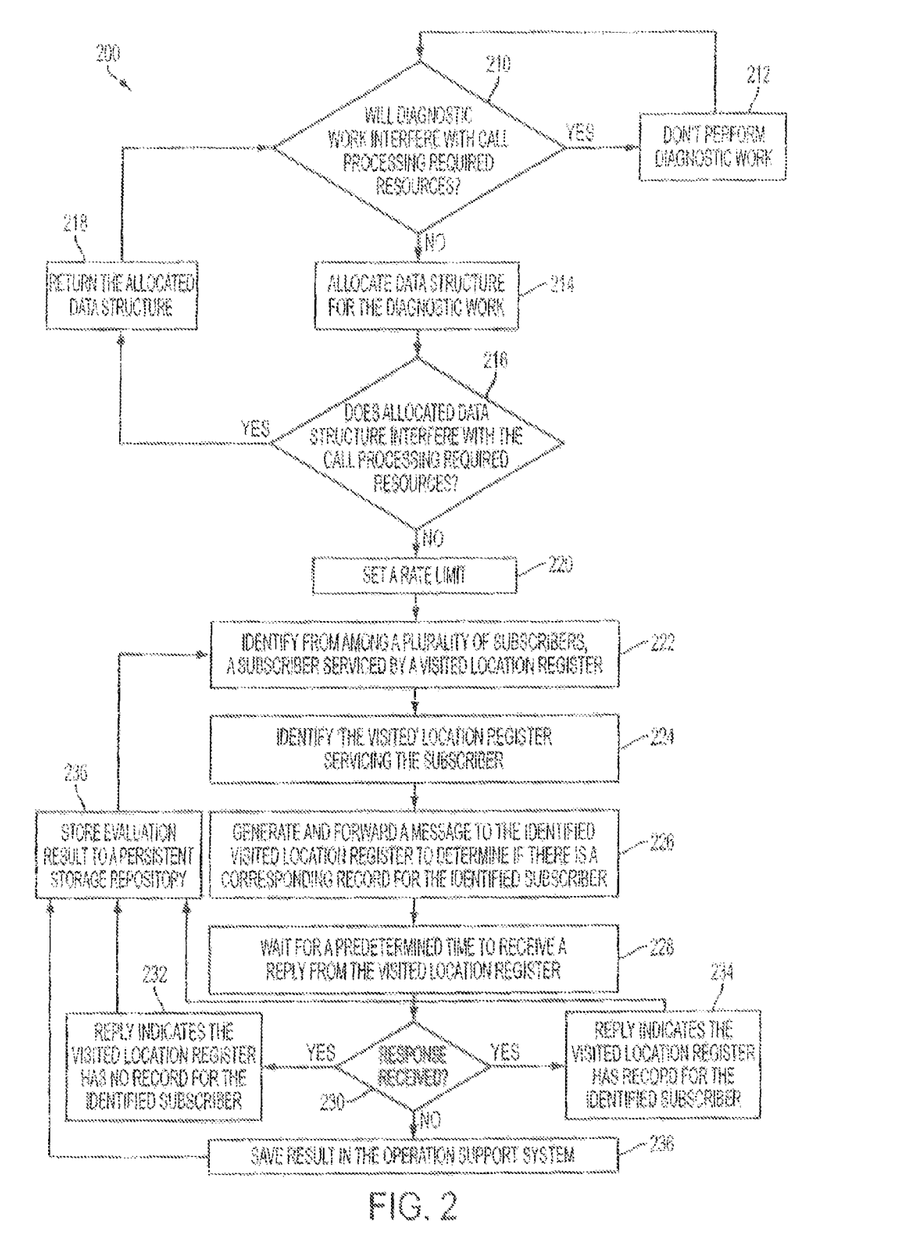
FIG. 2 illustrates an exemplary computer-implemented method for systematically evaluating the accuracy of mobility data in HLR.

With this overview, it may be helpful to refer to an exemplary figure that illustrates aforementioned computer-implemented method in more detail. FIG. 2 illustrates an exemplary computer-implemented method 200 for systematically evaluating the accuracy of the mobility data in the HLR. In keeping with the previous examples and for convenience, particular components described with respect to FIG. 1 are referenced as performing computer-implemented method 200. More particularly, HLR 134 performs the actions associated with computer-implemented method 200. In one example, the integrity processing unit 134a performs the actions associated with computer-implemented method 200 in the integrity processing unit 134a. To do so, the integrity processing unit 134a may use the mobility data stored in memory 134b. It should be noted that other components of/or associated with mobile communication network 100 can also perform the actions associated with computer-implemented method 200. For one example, VLR 154 instead of HLR 134 can also perform the actions associated with computer-implemented method 200.

The computer-implemented method 200 begins with identifying whether the diagnostic work will interfere with call processing required resources at HLR 134 (210). In one implementation, it is essential that diagnostic work (e.g., evaluating the accuracy of the mobility data at HLR 134) not to interfere with resources required for call processing due to real-time nature of the HLR's operation. To this end, action (210) is provided as procedural entry point for computer-implemented method 200 and provides "if and only if" control prior to resource allocation and/or execution of other actions.

If it is determined that the diagnostic work at HLR 134 is likely to interfere with the call processing required resources (210, yes), HLR 134 will not perform the diagnostic work (212). Instead, HLR 134 will continue to monitor its resources to identify a window in which the diagnostic work is not likely to interfere with the call processing required resources (210). When, on the other hand, it is determined that the diagnostic work at HLR 134 is not likely to interfere with the call processing required resources (210, no), HLR 134 allocates data structure 136 for the diagnostic work (214). The allocated data structure 136 may be necessary to store information about a subscriber during a test period and also to record information about the accuracy of the mobility data in HLR 134. In one example, the stored information includes mobile identification number and the result associated with the accuracy of HLR's record for the identified subscriber. The allocated data structure may be reused during sequential execution of computer-implemented method 200 for other subscribers to minimize the impact on real-time resources and performance of HLR 134.

After allocating data structure for the operation, HLR 134 may check to determine whether it can continue diagnostic work (216). That is, HLR 134 may check to determine whether the allocated data structure interferes with the call processing operation of HLR 134. Accordingly, action (216) acts as a specific safety mechanism to ensure that real-time call processing receives priority over the diagnostic work (e.g., evaluating data accuracy). If it is determined that the allocated data structure interferes with the call processing operation of HLR 134 (216, yes), HLR 134 returns the allocated data structure (218) and may continue to identify a window in which the diagnostic work is not likely to interfere with the call processing required resources (looping through actions (210)-(216)). If, however, it is determined that the allocated data structure does not interfere with the call processing operation of HLR 134 (216, no), HLR 134 continues the operation and sets a rate limiter (220).

In one implementation, the rate limiter ensures prudent resource allocation in a real-time environment. The value of the rate limiter may be derived from HLR subscriber volume and the planned test interval. This value may be used to set the frequency by which the computer-implemented method 200 is sequentially executed. That is, it may define a waiting time for HLR 134 before authorizing it to perform computer-implemented method 200 for another subscriber serviced by a VLR. To this end, the rate limiter may be configurable in real-time by process administrator and/or system based load control metrics with the intent of providing a fail-safe operating mode in a manner similar to action (216). The rate limiter may include a minimum and a maximum value. The minimum and maximum values of the rate limiter may provide millisecond resolution with at least a 16-bit data type.

After setting the rate limiter, HLR 134 identifies, from among a plurality of subscribers, a subscriber serviced by a VLR (222). In one implementation, HLR 134 uses a pseudo-random number generator to select a unique subscriber from HLR's subscriber volume. In another implementation, HLR 134 uses a feedback group selection to select a unique subscriber from HLR's subscriber volume. In the first implementation, HLR 134 may first identify, from among a plurality of subscribers within its subscriber volume, subscribers having foreign addresses (SS7 point code) and then randomly selects, from among the identified subscribers, one or more subscribers. This mechanism ensures that the one or more selected/identified subscribers are indeed serviced by a VLR (e.g., VLR 154). In the second implementation, HLR 134 may simply identify a subscriber from among a plurality of previously identified subscribers to reevaluate the results of the previous events. That is, HLR 134 uses one or more previously identified subscribers to reevaluate the output associated with each of them and to determine whether there has been any change. Regardless of the implementation used to identify a subscriber, identifying a subscriber includes identifying a mobile identification number assigned to a mobile device of the subscriber. In keeping with the previous example, HLR 134 may identify a mobile identification number assigned to mobile device 112.

After identifying the subscriber, HLR 134 identifies the VLR currently listed as servicing the identified subscriber (224). To do so, in one implementation, HLR 134 references its record for the subscriber to identify the VLR currently assigned to the mobile identification number. For example, HLR 134 may reference an internal table, including at least two columns, one identifying the HLR's subscriber using the subscribers' mobile identification number and another column identifying the subscribers' locations. The location of the identified subscriber may either point to the HLR itself or to a VLR within a network. In keeping with the previous example, HLR 134 identifies that VLR 154 is servicing mobile device 112.

The HLR 134 generates and forwards a message to the identified VLR (e.g., VLR 154) to determine if there is a corresponding record for the identified subscriber (226). A candidate message type for this operation is the IS-41 qualification directive which should provide a result sufficient to characterize whether VLR 154 includes a corresponding record for the identified subscriber. Thereafter, HLR 134 waits for a predetermined time to receive a reply from VLR 154 (228) and checks to determine whether a response has indeed been received (230). Based on the response or lack thereof, HLR 134 determines the accuracy of the HLR's record for the identified subscriber.

In keeping with the previous example and in one scenario, HLR 134 receives from VLR 154 a reply indicating absence of record for mobile device 112 (232). Upon receiving the message from HLR 134, VLR 154 identifies that there is indeed a record for mobile device 112, however to ensure that the record is current (e.g., mobile device 112 has not moved out of the overall network without informing VLR 154), VLR 154 may perform a search for the physical location of mobile device 112 within its network (e.g., visited network 140). In doing so, VLR 154 determines that mobile device 112 no longer is within its network. The VLR 154 updates its record, accordingly and informs HLR 134 of the same. Based on this reply, HLR 134 determines that its record for the identified subscriber is not accurate. To this end, HLR 134 may take a corrective action to avoid sending traffic to VLR 154 for the identified subscriber.

In another scenario, HLR 134 receives, from the identified VLR and in response to the forwarded message, a reply indicating a presence of record for the identified subscriber (234). For example, after performing a search for mobile device 112, VLR 154 may indeed confirm that its record is accurate (e.g., mobile device has not moved out of the network) and reports the same to HLR 134. Alternatively, VLR 154 may choose not to confirm the validity of its record and may simply report the data stored therein to HLR 134. In either case, based on the reply, HLR 134 determines that its record for the identified subscriber is accurate.

In yet another scenario, HLR 134 receives, from the identified VLR and in response to the forwarded message, no reply (236). Minimally, the transaction (e.g., forwarding the message and waiting for a reply) should be evaluated for state information indicating the accuracy of data in HLR 134 on discrete time period. Such discrete time period may be useful for the analysis involving event correlation in a distributed system. For example, it may limit the resources that is being used to a particular time period. To this end, HLR 134 waits for a predetermined time to receive a reply from the VLR, and if no reply is received within this time period, HLR 134 concludes that its record is inaccurate.

Regardless of the categorization of the reply, HLR 134 stores the evaluation result to a persistent storage repository for subsequent analysis (236). In one example, HLR 134 may store the evaluation result within its internal memory 134*b*. In another example, to save its resources, HLR 134 may store the evaluation result in an OSS 138, separated from the HLR's internal memory. OSS may have a terminal connection to HLR 134 to start/stop the process 200 and may include storage to process the data that is produced as a result of process 200.

Thereafter, HLR 134 may wait for the rate limiter to expire and then continues the operational steps of the method for an additional subscriber. To this end, HLR 134 identifies another subscriber serviced by a visited network and checks whether its data is accurate for the identified subscriber according to the above-described manner That is, after identifying a VLR serving the subscriber, HLR 134 forwards a message to the VLR to determine whether the VLR has a corresponding record for the identified subscriber. As noted above, the VLR may respond to the message indicating that indeed there is a corresponding record for the identified subscriber. Alternatively, the VLR may respond to the message indicating that there is no corresponding record for the identified subscriber, or the VLR may simply fail to respond to the message within a predetermined time period.

In the first case, HLR 134 determines that its mobility data for the identified subscriber is accurate, whereas in the second case, HLR 134 determines that its mobility data for the identified subscriber is not accurate. In either case, HLR 134 stores the test results to a persistent storage repository for subsequent analysis (e.g., review by operation staff and posterior correlation analysis). Along these lines, HLR 134 continues the operational steps of the method until it collects sufficient data to establish statistical significance while consuming the least system resources required.

Figure 3:
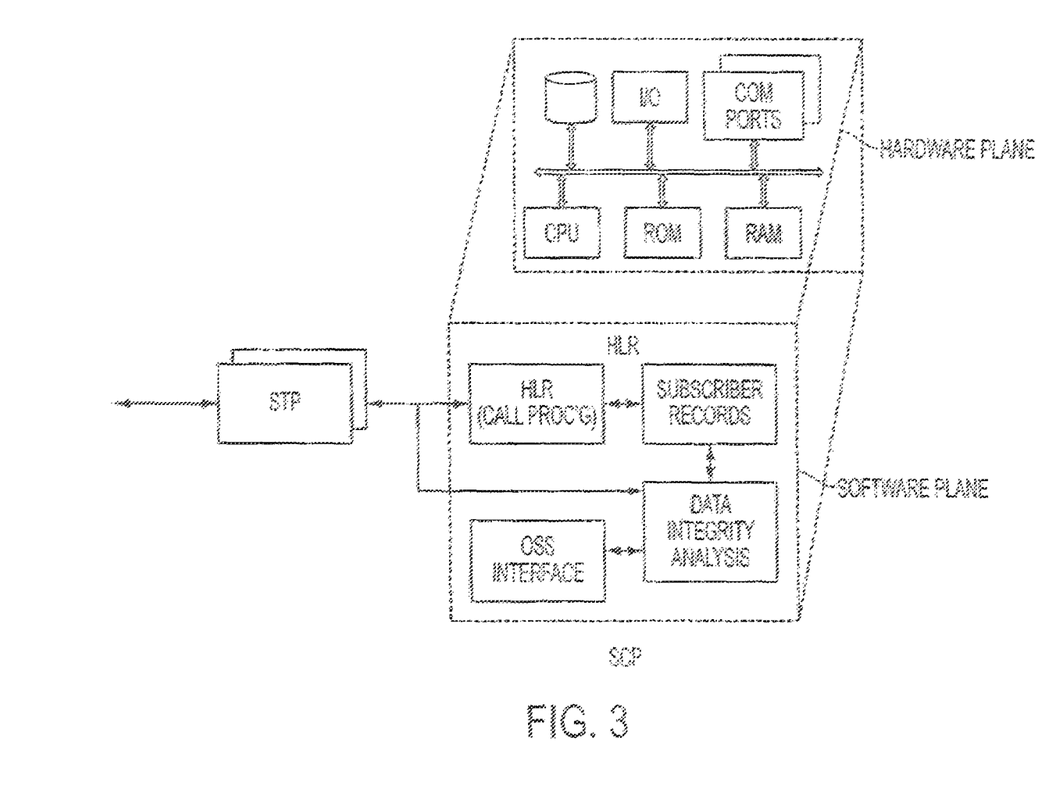
FIG. 3 illustrates software applications or programs on the front plane of a Service Control Point ("SCP"), whereas the back plane represents a high-level functional diagram of the hardware elements of such a platform.

With the information produced, a mobile service provider gains valuable information about the "correctness" of its mobility management subsystems. This information can be utilized in a variety of ways. The provider can use this information to observe accuracy over time. Additionally or alternatively, the provider can use this information to identify inflection points, which may be correlated to discrete events such as hardware and software changes, environmental conditions, and other conditions. Additionally or alternatively, the operator can use this information to identify persistent and inaccurate information and correct them. Other implementations are also contemplated A number of integrity related functions discussed above are implemented in our example in the node serving as HLR 134. Although skilled artisans should be generally familiar with HLRs, it may help some readers to discuss an example of the hardware and software that may be used in a bit more detail. For example, in some networks, the computer or server providing the HLR functionality is referred to as a SCP. FIG. 3 illustrates the software applications or programs on the front plane of a SCP, whereas the back plane represents a high-level functional diagram of the hardware elements of such a platform. Those skilled in the art will recognize that SCP may be implemented in a multi-processor environment or as a distributed computing system comprising a number of such computers. In the illustrated example, the SCP is implemented as a general purpose server, hosts computer or the like, although those skilled in the art will recognize that special purpose hardware may be used. The illustrated example therefore is intended to represent a class of general purpose computer hardware that may be programmed to perform its respective processing and to perform the attendant communications via the network(s). Each such computer, for example, includes a data communication interface for packet data communication, in this case, in compliance with the SS7 protocol.

The computer also includes a central processing unit ("CPU") in the form of one or more processors, for executing program instructions. The computer platform also includes program storage and data storage for various data files to be processed and/or communicated by the platform, to perform its HLR functions, related reporting/maintenance functions as well as the HLR data integrity analysis under discussion here. The hardware elements operating systems and programming languages of such servers are conventional in nature, and it presumed that those skilled in the art are adequately familiar therewith.

The illustrated hardware may run any number of different types of software programs. The software functionalities involve programming, including executable code as well as associated stored data, e.g. objects for the testing. The software code is executable by the general-purpose computer that functions as the server. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for systematically evaluating the accuracy of data in the HLR, in essentially the manner performed in the implementations discussed and illustrated herein. As used herein, terms such as computer or machine "readable medium" refer to any tangible storage medium that participates in providing instructions to a processor for execution.

For purposes of its operation as an SCP for HLR and related call processing functions, the computer of the SCP stores and executes one or more application programs for call processing, accessing subscriber records, performing data integrity analysis, and OSS interface. The subscriber records may include data regarding the valid stations' identifications, the assigned telephone numbers, subscription service options, terminal capabilities, mobility data, etc. The data integrity analysis may be similar to the computer-implemented method 200. In particular, in one implementation, the data integrity analysis is configured to enable systematic evaluation of the accuracy of the mobility data within the subscriber records as described above with respect to FIG. 2. The OSS interface may provide a terminal connection to the OSS 136, which is separated from the SCP and may permit storing, within OSS 136, the information produced from the data integrity analysis. Other implementations are also contemplated.

What is claimed is:

1. A computer-implemented method, comprising operational steps of:
   identifying, from among a plurality of mobile devices having records in a home location register of a mobile communication network, a mobile device having a record in the home location register indicating the identified mobile device is registered for network servicing via a visited location register;
   identifying, from the record for the identified mobile device in the home location register, the visited location register indicated as servicing the identified mobile device; and
   independent of call processing and in the absence of interference with resources required for call processing at the home location register:
      forwarding a message to the identified visited location register to determine if there is a corresponding record for the identified mobile device in the identified visited location register;
      determining, based on a reply, if any, to the forwarded message or lack thereof, the accuracy of the indication of registration for network servicing with the identified visited location register in the record at the home location register for the identified mobile device; and
      recording a result associated with the determination of accuracy.

2. The computer-implemented method of claim 1, wherein:
   determining the accuracy of the home location register's record for the identified mobile device includes determining that the home location register's record is inaccurate because the visited location register has no record for the identified mobile device; and
   the method further comprises taking a corrective action to avoid sending, from the home location register, signaling traffic for the identified mobile device to the visited location register, based on the determination that the home location register's record is inaccurate.

3. The computer-implemented method of claim 1, wherein the recording step comprises providing, based on the determination of the accuracy of the home location register's record for the identified mobile device, a record of details about inaccuracy of the home location register's record for the identified mobile device and to thereby identify system faults.

4. The computer-implemented method of claim 1, further comprising enhancing, based on the result associated with the determination of the accuracy of the home location register's record for the identified mobile device, performance of a mobility management system associated with the home location register.

5. The computer-implemented method of claim 1, further comprising repeating the operational steps with respect to other mobile devices to systematically evaluate accuracy of mobility data stored at the home location register.

6. The computer-implemented method of claim 5, wherein each step of identifying a respective mobile device includes identifying the respective mobile device, from among the plurality of mobile devices, using a pseudo random selection scheme to select the respective mobile device from a mobile device volume of the home location register, or using a feedback group selection scheme to select the respective mobile device from one or more previously identified mobile devices.

7. The computer-implemented method of claim 6, wherein using the pseudo random selection scheme comprises:
   identifying, from among a plurality of mobile devices from the mobile device volume of the home location register, foreign address devices having SS7 point codes; and
   randomly selecting from among the identified foreign address devices.

8. The computer-implemented method of claim 5, further comprising setting, via a rate limiter, a frequency at which the operational steps are sequentially executed for each of the mobile devices.

9. The computer-implemented method of claim 8, wherein the rate limiter is configurable in real-time based on load control metrics at the home location register.

10. The computer-implemented method of claim 1, wherein the step of determining the accuracy of the home location register's record for the identified mobile device includes:
    comparing, for the identified mobile device, the visited location register's record with the home location register's record, and
    determining, based on the result of comparison, that the home location register's record for the identified mobile device is accurate.

11. The computer-implemented method of claim 1, further comprising implementing a safety mechanism to ensure that real-time call processing at the home location register receives priority over evaluating data accuracy.

12. The computer-implemented method of claim 1, further comprising:
    monitoring the resources to identify a period of time during which evaluation of the accuracy of data in the home location register will not interfere with the call processing or resources used for the call processing; and
    performing the steps of forwarding, determining and recording only during the identified period.

13. A home location register for a mobile communication network, comprising:
    a processing unit;
    a memory; and
    executable instructions in the memory for the processing unit,
    wherein execution of the instructions by the processing unit cause the home location register to perform functions independent of call processing and in the absence of interference with resources required for call processing at the home location register, including functions to:
       identify, from among a plurality of mobile devices having records in the home location register, a mobile device having a record in the home location register indicating the identified mobile device is registered for network servicing via a visited location register;
       identify, from the record of the identified mobile device in the home location register, the visited location register indicated as servicing the identified mobile device;
       forward a message to the identified visited location register to determine if there is a corresponding record for the identified mobile device in the identified visited location register;
       determine, based on a reply, if any, to the forwarded message or lack thereof, the accuracy of the indication of registration for network servicing with the identified visited location register in the record at the home location register for the identified mobile device; and
       record a result associated with the determination of accuracy.

14. The home location register of claim 13, wherein execution of the instructions by the processing unit further cause the home location register to repeat the functions with respect to other mobile devices, to systematically evaluate accuracy of mobility data stored at the home location register.

15. The home location register of claim 13, wherein the function to identify the mobile device comprises a function to use:
   a pseudo random selection scheme to select the respective mobile device from a mobile device volume of the home location register, or
   a feedback group selection scheme to select the respective mobile device from one or more previously identified mobile devices.

16. The home location register of claim 13, wherein the memory further includes executable instructions for causing the processing unit to receive, from the visited location register and in response to the forwarded message, a reply indicating presence of a record for the identified mobile device.

17. The home location register of claim 16, wherein to determine the accuracy of the home location register's record for the identified mobile device, the instructions configure the processing unit to:
   compare, for the identified mobile device, the visited location register's record with the home location register's record, and
   determine, based on the result of comparison, that the home location register's record for the identified mobile device is accurate.

18. The home location register of claim 13, wherein the memory further includes executable instructions for causing the processing unit to receive, from the visited location register and in response to the forwarded message, a reply indicating absence of a record for the identified mobile device.

19. The home location register of claim 18, wherein to determine the accuracy of the home location register's record for the identified mobile device, the processing unit is configured to determine, based on the reply from the visited location register, that the home location register's record for the identified subscriber is inaccurate.

* * * * *